United States Patent [19]
Jesionowski

[11] Patent Number: 6,044,442
[45] Date of Patent: Mar. 28, 2000

[54] EXTERNAL PARTITIONING OF AN AUTOMATED DATA STORAGE LIBRARY INTO MULTIPLE VIRTUAL LIBRARIES FOR ACCESS BY A PLURALITY OF HOSTS

[75] Inventor: Leonard George Jesionowski, Tucson, Ariz.

[73] Assignee: International Business Machines Corporation, Armonk, N.Y.

[21] Appl. No.: 08/976,050

[22] Filed: Nov. 21, 1997

[51] Int. Cl.[7] ............................. G06F 12/02; G11B 15/00
[52] U.S. Cl. ......................... 711/153; 711/100; 711/114; 711/147; 711/112
[58] Field of Search ..................... 711/100, 111, 711/112, 114, 147, 153, 170, 173; 707/204, 205

[56] References Cited

U.S. PATENT DOCUMENTS

| | | | |
|---|---|---|---|
| 5,018,060 | 5/1991 | Gelb et al. .............................. | 707/205 |
| 5,164,909 | 11/1992 | Leonhardt et al. ................. | 364/478.03 |
| 5,233,692 | 8/1993 | Gajjar et al. ............................. | 710/129 |
| 5,265,082 | 11/1993 | Gniewek et al. ......................... | 369/53 |
| 5,289,589 | 2/1994 | Bingham et al. ......................... | 710/128 |
| 5,303,214 | 4/1994 | Kulakowski et al. ..................... | 369/34 |
| 5,416,914 | 5/1995 | Korngiebel et al. ..................... | 711/114 |
| 5,418,971 | 5/1995 | Carlson ..................................... | 710/24 |
| 5,526,507 | 6/1996 | Hill ........................................ | 711/114 |
| 5,539,660 | 7/1996 | Blair et al. ............................... | 370/380 |
| 5,546,557 | 8/1996 | Allen et al. ............................... | 711/111 |
| 5,594,922 | 1/1997 | Suzuki et al. ............................. | 710/17 |
| 5,664,146 | 9/1997 | Bolin et al. .............................. | 711/115 |
| 5,757,594 | 5/1998 | Dang et al. ............................... | 369/191 |
| 5,805,864 | 9/1998 | Carlson et al. ..................... | 395/500.45 |
| 5,809,511 | 9/1998 | Peake ....................................... | 707/204 |
| 5,870,732 | 2/1999 | Fisher et al. .............................. | 707/1 |

*Primary Examiner*—Eddie P. Chan
*Assistant Examiner*—Than Nguyen
*Attorney, Agent, or Firm*—John H. Holcombe; Robert M. Sullivan

[57] ABSTRACT

Disclosed are a method and processor external to an automated data storage library for partitioning the data storage library into multiple virtual libraries for access by a plurality of hosts, each host having a host port, the data storage library having a plurality of data storage drives, a plurality of storage slots, a library controller, the library controller identifying each of the data storage drives and the storage slots, a library port coupled to the library controller, and at least one accessing robot controlled by the library controller, comprising the steps of, at a node intermediate the library port and host ports, inquiring of the host ports to identify the number of host ports; inquiring, via the library port, of the library controller to determine the data storage drive identifiers and the total number of the storage slots; identifying by employing the data storage drive identifiers, the data storage drives associated with each host port; and sequentially creating virtual libraries, assigning to each virtual library at least one host port, the data storage drives identified as associated with the assigned host port, and a portion of the storage slots (s).

38 Claims, 5 Drawing Sheets

EXTERNAL PARTITIONING OF AN AUTOMATED DATA STORAGE LIBRARY INTO MULTIPLE VIRTUAL LIBRARIES FOR ACCESS BY A PLURALITY OF HOSTS

TECHNICAL FIELD

This invention relates to automated data storage libraries which transport portable data storage media between storage slots and data storage drives, and, more particularly, to the sharing of an automated data storage library between multiple hosts externally of the automated data storage library.

BACKGROUND OF THE INVENTION

Automated data storage libraries are known for providing cost effective access to large quantities of stored data. Generally, data storage libraries include a large number of storage slots on which are stored portable data storage media. The typical portable data storage media is a tape cartridge or an optical cartridge. An accessing robot typically accesses the data storage media from the storage slots and delivers the accessed media to a data storage drive for reading and/or writing data on the accessed media. Suitable electronics both operate the accessing robot and operate the data storage drives to transmit and/or receive data from an attached on-line host computer system.

In a conventional automated data storage library, the storage slots are arranged in a planar orthogonal arrangement forming a "wall" of data storage media. The plane may be a flat plane, or may be a cylindrical plane. To double the storage capacity, two "walls" of data storage media may be provided on either side of the accessing robot.

A number of different companies manufacture automated data storage libraries today, each model displaying various different features. Some of the most expensive automated data storage libraries offer the capability of sharing the entire library with a plurality of hosts, such as the IBM 3494 Data Storage Library These automated data storage libraries have the internal capability to allocate storage slots and to handle contentions among the hosts for the same library components.

It would be advantageous in the lower cost environment to be able to share a library among multiple hosts and therefore amortize the cost of the library more widely. It is often difficult, however, to design components that can respond to multiple hosts. Frequently, this level of flexibility requires the addition of a cumbersome layer of supervisory software code in the library, which both increases the need for processing capability of the library and which can ultimately reduce the performance of other aspects of the library. Developing software for an automated data storage library to internally enable multiple incompatible hosts to manage a shared inventory may require a redesign of the library programming and may be sufficiently expensive as to be prohibitive for the low cost environment.

One example of a library sharing arrangement is the use of the multiple addresses for various components at connected ports having "relay drives", the multiple addresses comprising differing "logical unit numbers" in SCSI parlance so that a host sends robot accessor commands to a "relay" drive which forwards the commands over a loop or bus to a library controller. This approach requires modifications to the components of the automated data storage library. This approach is described in coassigned U.S. patent application Ser. No. 08/931,856, filed Sep. 16, 1997, Basham et al.

In the low cost environment where hosts and libraries alike are often mass produced devices, it would be advantageous to have a library sharing capability which does not require modification to any of the components of the mass produced automated data storage library.

SUMMARY OF THE INVENTION

It is therefore an object of the present invention to provide multi-host sharing of an automated data storage library externally of the library.

Disclosed are a method and processor external to an automated data storage library for partitioning the data storage library into multiple virtual libraries for access by a plurality of hosts, each host having a host port, the data storage library having a plurality of data storage drives, a plurality of storage slots, a library controller, the library controller identifying each of the data storage drives and identifying the storage slots, a library port coupled to the library controller, and at least one accessing robot controlled by the library controller, comprising the steps of:

all steps at a node intermediate the library and the hosts, inquiring of the host ports to identify the number thereof;

inquiring at the library port of the library controller to determine the data storage drives and the total number of the storage slots;

identifying each data storage drive associated with each host port; and sequentially creating virtual libraries, assigning to each virtual library at least one host port, the data storage drives identified as associated with the host port, and a portion of the storage slots.

Alternatively, an operator interface is provided at which an operator may select a number of the hosts to share a single one of the virtual libraries by identifying extra host ports for a single virtual library, the total number of virtual libraries (n) therefore being reduced to the effective number of hosts remaining after combining the hosts sharing virtual libraries, and wherein the step of sequentially assigning to each of the host ports (h) the portion of the storage slots (s) comprises assigning the same storage slots to the host ports sharing the one of the virtual libraries.

Additionally, an operator may select a number of the storage slots to be assigned to one of the virtual libraries, and the step of sequentially assigning the storage slots to the virtual library additionally comprises designating the operator selected number of the storage slots to be assigned to the selected virtual library, and sequentially assigning the remaining storage slots to the remaining virtual libraries equally.

Further, an operator may provide an identification of ones of the data storage drives to be assigned to ones of the virtual libraries.

Still further, the resultant shared library is operated by responding to a command received at one of the host ports, determining the virtual library that the host port is assigned to, and, if the received command is a request for operating the virtual library, by determining whether the received command parameters are valid for the virtual library, and, if valid, by supplying the request to the library controller.

For a fuller understanding of the present invention, reference should be made to the following detailed description taken in conjunction with the accompanying drawings.

DETAILED DESCRIPTION OF THE INVENTION

Figure 1:
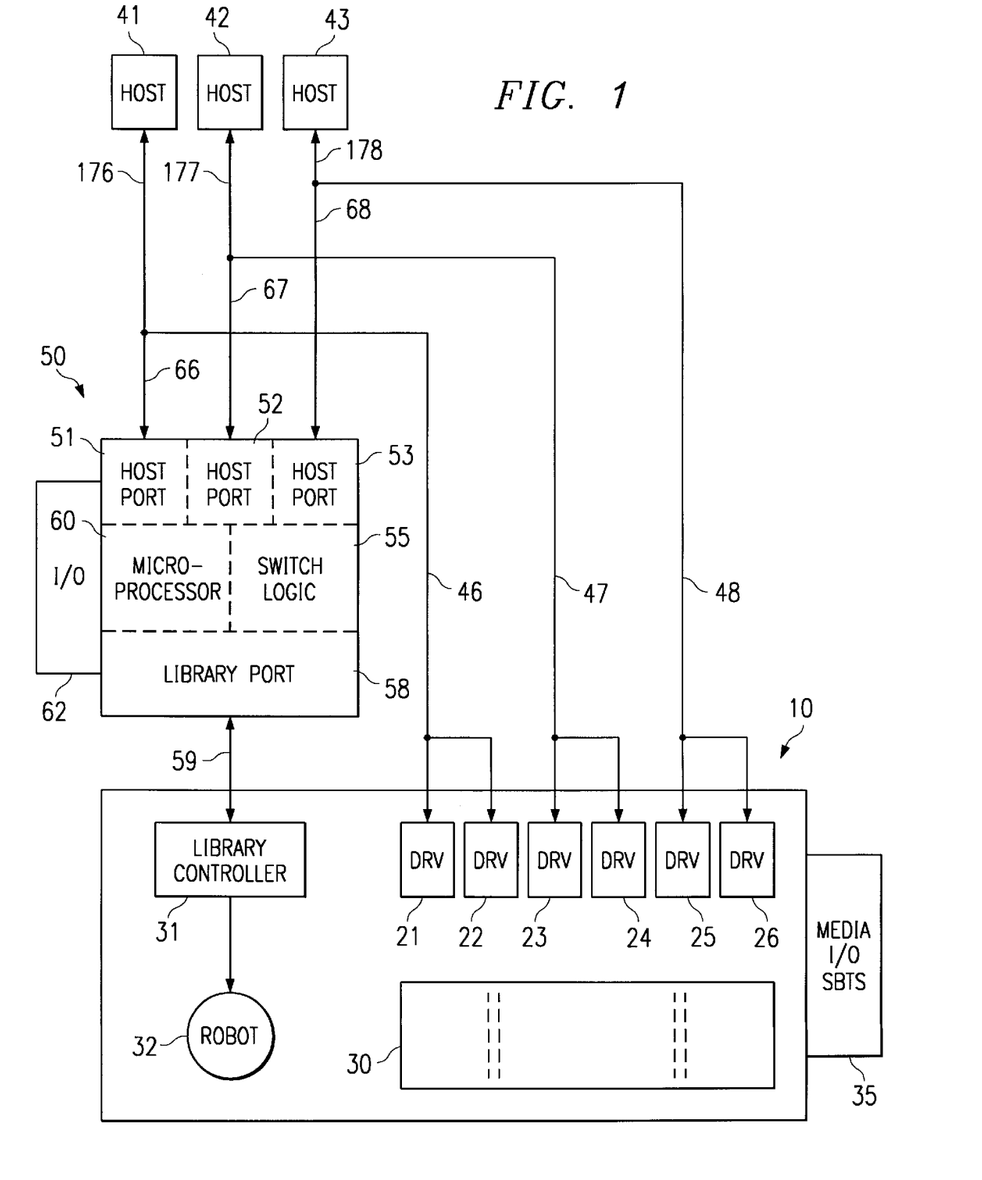
FIG. 1 is a diagrammatic representation of a system including an automated data storage library and multiple hosts with the external sharing processor of the present invention.

Referring to FIG. 1, an automated data storage library 10 is illustrated. The library 10 may comprise any conventional library which has a plurality of data storage drives, such as the illustrated data storage drives 21–26, a large number of storage slots 30, a library controller 31, and a robot accessor 32. Typically, such libraries 10 manage the positioning and access of portable data storage media, often self-contained within a portable container, or cartridge. Examples of such data storage media include magnetic tape cartridges or cassettes, optical disk cartridges of various types, including ROM, WORM and rewritable, and in various formats. For universal reference to any of these types of media, the terms "data storage media" or "media" are used herein.

An example of an automated data storage library 10 is the IBM 3575 Tape Library Dataserver, which stores magnetic tape cartridges. Typically, the library controller 31 comprises a data processor and suitable data memory and data storage capability to control the operation of the library 10. Specifically, the library controller 31 controls the actions of the accessing robot 32. The conventional library controller 31 is interconnected through a provided interface to a host processor, which provides commands requesting access to particular data storage media or to media in particular storage slots. Commands to search for data, or for locations on the data storage media, and information to be recorded on, or to be read from, selected data storage media are typically transmitted directly between the drives 21–26 and the host. The library controller 31 is typically provided with a database, which includes tables and programs.

The accessing robot 32 typically includes servos, motors, arms, grippers, sensors and other robotic, mechanical and electrical equipment to perform functions that include (at least) the accessing and transporting of data storage media between and among the storage slots 30 and the data storage drives 21–26. Optionally, media I/O slots 35 may be provided allowing the import of data storage media into the library 10 or the export of data storage media out from the library. The accessing robot also transports data storage media between the media I/O slots 35 and the storage slots 30 or the data storage drives 21–26.

Still referring to FIG. 1, multiple hosts, for example, hosts 41–43, are available to share the automated data storage library 10. Each of the hosts 41–43 is connected to at least one of the data storage drives 21–26 by means of a data path 46–48. The hosts 41–43 may comprise workstations, personal computers, servers, or other data processing hosts capable of exchanging data and control signals with the automated data storage library 10. As an example, the hosts 41–43 may comprise servers such as an IBM RS/6000 computing server with an IBM POWER-PC processor.

In FIG. 1, the present invention for allowing the sharing of the automated data storage library 10 amongst the hosts 41–43 is implemented at a node 50 intermediate the library and the hosts. The node 50 may comprise a multiplexor switch. The typical multiplexor switch comprises a plurality of input/output ports 51–53, which may be switched by switch logic 55 to be interconnected with selected other input/output ports, such as port 58. Although the typical multiplexor switch 50 has a plurality of input/output ports 58, the present invention employs only one input/output port to connect to automated data storage library 10 over cable or bus 59. The typical multiplexor switch 50 also comprises a microprocessor 60 which may be a programmable computer processor, and may comprise an input/output station 62, such as a keyboard and display. An example of a multiplexor switch is the McData DS-1000 Fibre Channel Switch.

Still referring to FIG. 1, in one embodiment of the invention, each of the hosts 41–43 is individually connected to a separate one of the input/output ports 51–53 by means of a control path 66–68. The input/output ports 51–53 are termed "host ports" for ease in defining the present invention. In the specific example illustrated in FIG. 1, the connections all comprise SCSI connections, and all ports are SCSI ports. Thus, busses 176–178 are provided and are combined control and data paths serving as both control paths 66–68 and data paths 46–48. Additionally, in the specific example, each of the hosts 41–43 is connected in a "daisy-chain" fashion to two drives. For example, host 41 is connected in daisy-chain fashion on data path 46 to both drive 21 and drive 22. "Daisy-chain" is one of the cabling techniques usable in the SCSI environment.

For one embodiment of the invention, it is desired to have the cabling of the drives (e.g., drives 21–22) on a common bus (e.g., bus 46, 66, 176) together with the connections between the host (e.g., host 41) and the corresponding host port (e.g., host port 51). Only one port 58 is utilized to provide the connection 59 to the library controller 31 of the automated data storage library 10.

Alternatively, ones of the drives 21–26 may be connected to a network served by a host or otherwise connected to the host by means other than a common bus. Such drives may be called "orphan" drives.

Although the specific example illustrated is a SCSI environment, other cabling and connection arrangements may be utilized.

In one embodiment, the present invention comprises a method implemented by a data processing computer. In another embodiment, the invention comprises a system employing a data processing computer, comprising microprocessor 60 in the example of FIG. 1. The invention may also be implemented to provide a signal bearing medium tangibly embodying computer readable code as a computer program product stored in a storage device, such as a magnetic disk drive or memory, etc., in a computer, or as an article of manufacture, such as a CD ROM, magnetic tape, etc.

As illustrated in FIG. 1, the method of the present invention is implemented in a processor 60 external to the automated data storage library 10 for partitioning the data storage library into multiple virtual libraries for access by a plurality of hosts 41–43, each host having a host port 51–53, respectively. The partitioning comprises configuring the library to assign certain ones of the data storage drives 21–26 to respective ones of the virtual libraries, and also to assign certain ones of the storage slots 30 to respective ones of the virtual libraries.

In accordance with the present invention, the external partitioning of the automated data storage library 10 in accordance with the present invention may be accomplished automatically, or may alternatively allow specific selections to be made by a user.

Figures 2, 3:
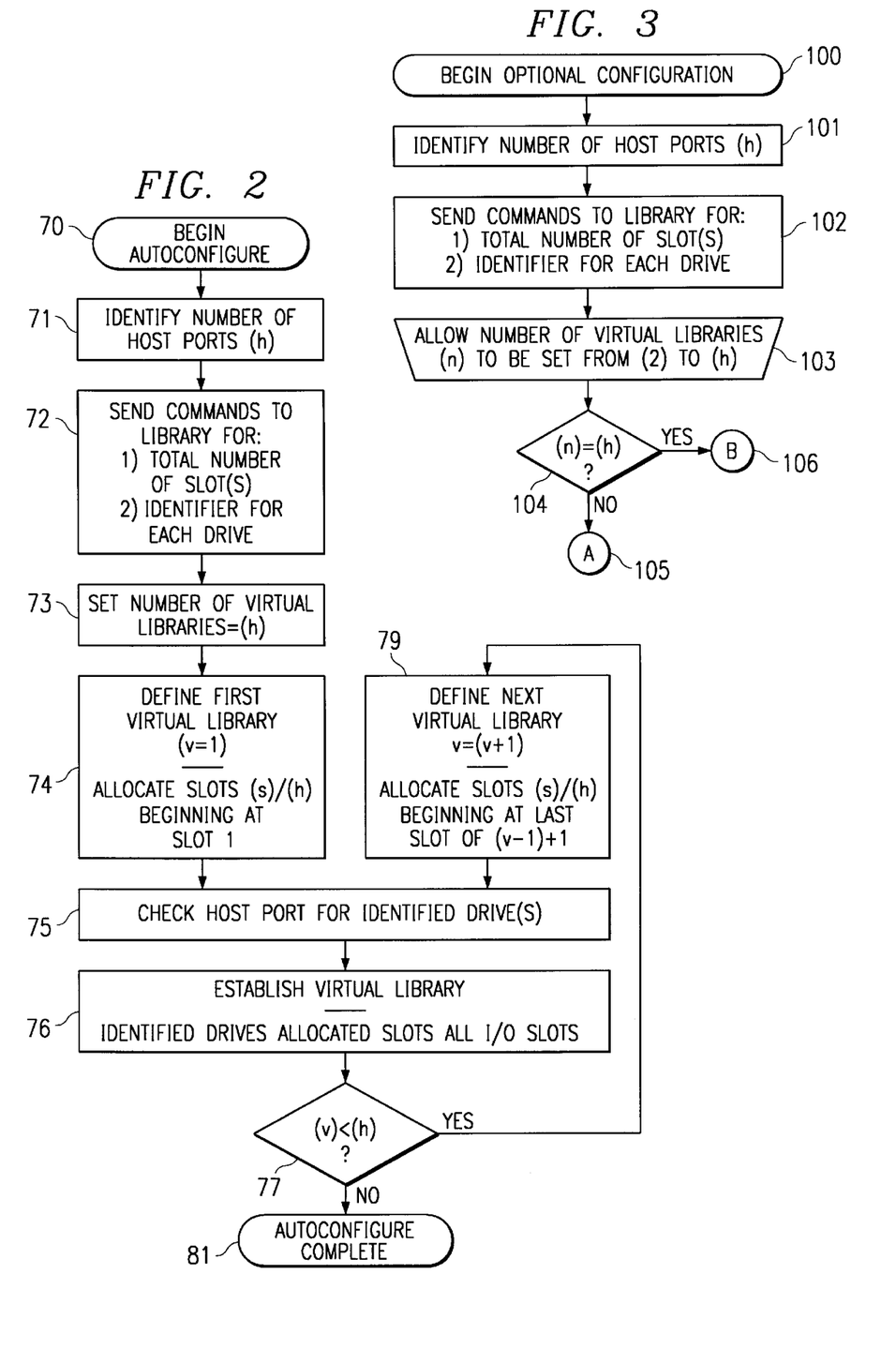
FIG. 2 is a flow chart depicting the method of the present invention for autoconfiguring the system of FIG. 1.
FIGS. 3–6 are flow charts depicting aspects of the method of the present invention allowing an operator to specify various aspects of the automated data storage library of FIG. 1.

FIG. 2 is a flow chart illustrating the automatic configuration of the virtual libraries.

Referring to FIGS. 1 and 2, the configuration may begin at step 70 automatically at every power-on of the library 10 or in response to some user-initiated event, such as a keypress at an operator panel or multiplexor I/O station 62. The user will have connected the hosts 41–43 to the host ports 51–53. The first step 71 of the process is to operate the multiplexor switch 50 to identify the number of host ports 51–53. The number of host ports is given the designation (h), for the purpose of illustration. In step 72, commands are sent, via library port 58, to the library controller 31 to identify 1) the total number of slots 30 in the library 10, and 2) to identify the unique identifier (e.g., serial number) for each data storage drive 21–26 of the library. The library controller responds to the commands by supplying the requested information, either from tables or by query, to the library port 58 and microprocessor 60. In the autoconfigure mode, step 73 sets the number of virtual libraries (v) to equal the number of host ports (h).

The first virtual library, v=1, is defined in step 74, in which the storage slots are equally divided amongst the virtual libraries according to the equation (s)/(h), wherein (s) is the total number of storage slots 30 available for the virtual libraries, and (h) is the number of host ports 51–53. The definition of the first virtual library (for host port 51) may take the following form, wherein [v] represents the index of all defined virtual libraries from 1 to (h):

v=1
extra_assigned_host ports[v]=0
first_slot[v]=1
last_slot[v]=s/h
virtual_library_slots[v]=s/h.

In step 75, the host port 51 for host 41 is checked for the presence of connected library data storage drives, for example, by sending a command at host port 51 to identify the connected data storage drives. In the example of FIG. 1, SCSI Inquiry commands are sent, to identify data storage drives 21 and 22.

Step 76 establishes each virtual library and makes it available at the host port composed of:

virtual_library=v
virtual_library_slots[v] from first_slot[v] to last_slot [v]
all identified drives for host_port[v]
all I/O slots (optionally, the I/O slots 35 could also be split).

For the first virtual library, which is available at host port 51, the configuration is therefore as follows:

virtual_library=1
virtual_library_slots from slot 1 to slot (s)/(h)
all identified drives for host port 51, which are drive 21 and drive 22
all I/O slots 35.

The function of step 77 is to determine whether all virtual libraries have been established. Thus, the decision is whether the current virtual library (v) is less than the number of host ports (h). If "YES", the last virtual library has not been reached, and the process moves to define the next virtual library in step 79.

The next virtual library (v) value is incremented, v=v+1, in step 79, so that the next virtual library (v) is 2, and is defined as taking the next sequence of storage slots, which are equally divided amongst the virtual libraries, as described above. The definition of the next virtual library (for host port 52) may take the following form, wherein [v] represents the index of all defined virtual libraries from 1 to (h):

v=v+1
extra_assigned_host ports[v]=0
first_slot[v]=last_slot[v−1]+1
last_slot[v]=first_slot[v]+s/h
virtual_library_slots[v]=s/h.

Step 75 is repeated, this time for virtual library 2 for host 42. The corresponding host port 52 is checked for the presence of connected library data storage drives, for example, by sending a command at host port 52 to identify the connected data storage drives. In the example of FIG. 1, SCSI Inquiry commands are sent to identify data storage drives 23 and 24.

Step 76 establishes the next virtual library and makes it available at host port 52, with the configuration as follows:

virtual_library=2
virtual_library_slots from slot {(s)/(h)+1} to slot {(s)/(h)+(s)/(h)}
all identified drives for host port 52, which are drive 23 and drive 24
all I/O slots 35.

Step 77 again checks for completion of the configuration of all the virtual libraries and, again the process repeats steps 79, 75 and 76 for another virtual library.

Upon the final configuration of all the virtual libraries, the value of the last virtual library in step 77 will no longer be less than (h), but rather will be equal to (h), the number of host ports, so that the decision of step 77 of "NO", results in completion 80 of the automatic configuration.

Many alternative process steps can be envisioned for similarly accomplishing the configuration of the virtual libraries automatically, and are considered within the scope of the present invention.

Another aspect of the present invention is to employ the operator interface, or operator I/O station 62 in FIG. 1. The operator or user may select a number of the hosts 41–43 to share a single one of the virtual libraries by identifying extra host ports 51–53 for a single virtual library, the total number of virtual libraries (n) therefore being less than the total number of hosts (h) by the number of hosts sharing virtual libraries. Additionally, an operator may select a number of the storage slots 30 to be assigned to one of the virtual libraries. Further, the operator may identify those ones of drives 21–26 that are "orphan" drives which are connected to ones of the hosts other than by the common bus, and assign each orphan drive to one of the virtual libraries.

FIGS. 3–6 illustrate the optional configuration process allowing the user to select certain of the configuration parameters.

Referring to FIGS. 1 and 3, the optional configuration process is preferably selected 100 by a user by means of a keypress at I/O station 62. The first step 101 is identical to step 71 of the autoconfigure process, which operates the multiplexor switch 50 to identify the number of host ports 51–53. The number of host ports is given the designation (h), for the purpose of illustration. Similarly, step 102 may be identical to step 72 of the autoconfiguration process. Step 102 sends commands at library port 58 to the library controller 31 to identify 1) the total number of slots 30 in the library 10, and 2) to identify the unique identifier (e.g., serial number) for each data storage drive 21–26 of the library. The library controller responds to the commands by supplying the requested information, either from tables or by query, to the library port 58 and microprocessor 60.

In step 103, the user is prompted to optionally change the number (n) of virtual libraries to a value less than (h), thereby having a fewer number of virtual libraries than host ports. The prompting may take the form of Set the number_virtual_libraries (n) from 2 to (h). If the user sets the number to (h), the number of host ports, then no change is made. If the number is set to a value less than (h), then one or more of the host ports 51–53 will share a virtual library. Thus, step 104 senses whether the value of (n)=(h) has been retained. If "NO", connector 105 is indicated, and, if "YES" connector 106 is indicated.

Figure 4:
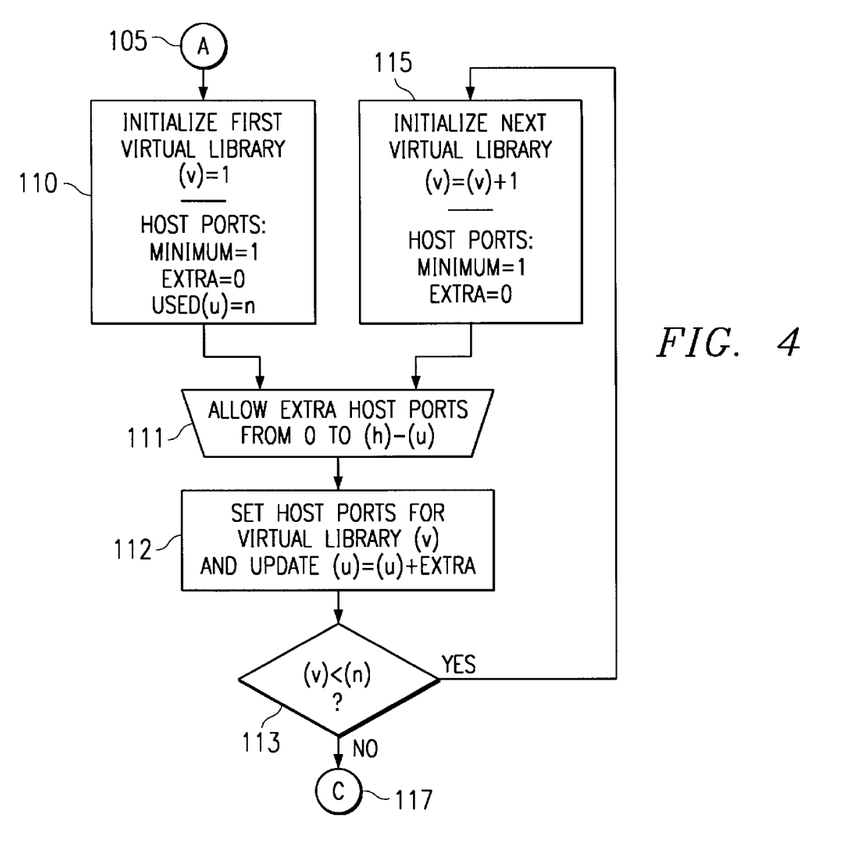

Referring to FIGS. 1 and 4, connector 105 (the path indicating that there are fewer virtual libraries than host ports and that there are multiple host ports for a single virtual library) leads to step 110. Because the virtual library that the user intends to share between hosts is unknown at this stage of the process, step 110 is provided to initialize the first virtual library with no extra host ports. Thus, the initial definition of the first virtual library (for host port 51) may take the following form, wherein [v] represents the index of all defined virtual libraries from 1 to (n):

v=1 extra_assigned_host_ports[v]=0 u (used ports)=n.

The initial value of the used ports is set to (n), the number of virtual libraries, to ensure that each virtual library has 1 host port. Thus, the minimum value of (u) is the number of virtual libraries (n).

Step 111 allows the user to assign extra host ports (e.g., host ports 52–53) to the first virtual library. The user is allowed to set the number of extra host ports to any value from 0 to (h)–(u). In other words, the user may assign up to the number of host ports available after taking into account the number of host ports designated as "used" and either already assigned or reserved for the remaining virtual libraries.

In step 112, the user may designate which host ports are the "extra" host ports from step 111 for the virtual library, and the number of "used" host ports is updated. The update resets the value from the previous "used" value to add in the number (if any) of extra host ports that were added in step 111. The update may take the form (u)=u+extra_assigned_host_ports[v].

The function of step 113 is to determine whether the host ports have been set for all the virtual libraries. Thus, the decision is whether the current virtual library (v) is less than the selected number of virtual libraries (n). If "YES", the last virtual library has not been reached, and the process moves to define the next virtual library in step 115.

Step 115 is provided to initialize the next virtual library, again, with no extra host ports. Thus, the initial definition of the next virtual library (for host port 52) may take the following form, wherein [v] represents the index of all defined virtual libraries from 1 to (n):

v=v+1 extra_assigned_host_ports[v]=0 u (used ports)=u.

The number of used ports is not changed, since the value was updated in step 112.

Step 111 is then repeated and allows the user to assign extra host ports to the next virtual library. The user is again allowed to set the number of extra host ports to any value from 0 to (h)–(u), where (u) was updated in step 112. In other words, the user may assign up to the number of host ports available after taking into account the number of host ports designated as "used" because they have either already been assigned or reserved for the remaining virtual libraries.

In step 112, the user may designate which host ports are the "extra" host ports from step 111 for the next virtual library, and the number of "used" host ports is updated. The update resets the value from the previous "used" value to add in the number (if any) of extra host ports that were added in step 111. Again, the update may take the form (u)=u+extra_assigned_host_ports[v].

Step 113 again determines whether the host ports have been set for all the virtual libraries. Thus, the decision is whether the current virtual library (v) is less than the selected number of virtual libraries (n). If "NO", the last virtual library has been reached, and the process moves to connector 117.

Figure 5:
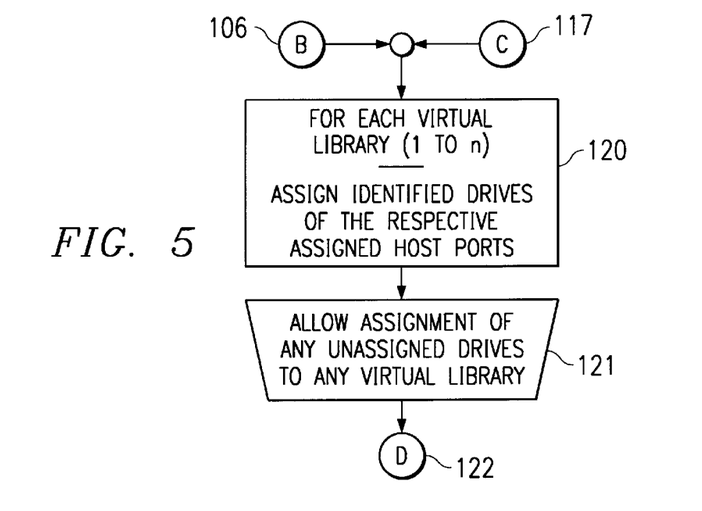

Referring to FIGS. 1 and 5, the connector 106 is from FIG. 3 and indicates that the user has selected the number of virtual libraries (n) to equal the number of host ports (h). An equivalent of step 112 will have been conducted to assign one host port to each virtual library. The connector 117 is from FIG. 4 and indicates that the user has selected the number of virtual libraries (n) to a number less than the number of host ports, meaning that at least one virtual library is shared by more than one host port 51–53.

Thus, in FIG. 5, for each virtual library, step 120 assigns the identified library data storage drives 21–26 (from step 102 in FIG. 3) of the respective assigned host port or ports 51–53 (from step 112 in FIG. 4). Should any data storage drive 21–26 be an "orphan" drive and be unassigned as the result of step 120, step 121 allows the user to assign any of the unassigned data storage drives to a virtual library. Step 121 results in recognition of the user assignment of the data storage drives. The process then proceeds to connector 122.

Figure 6:
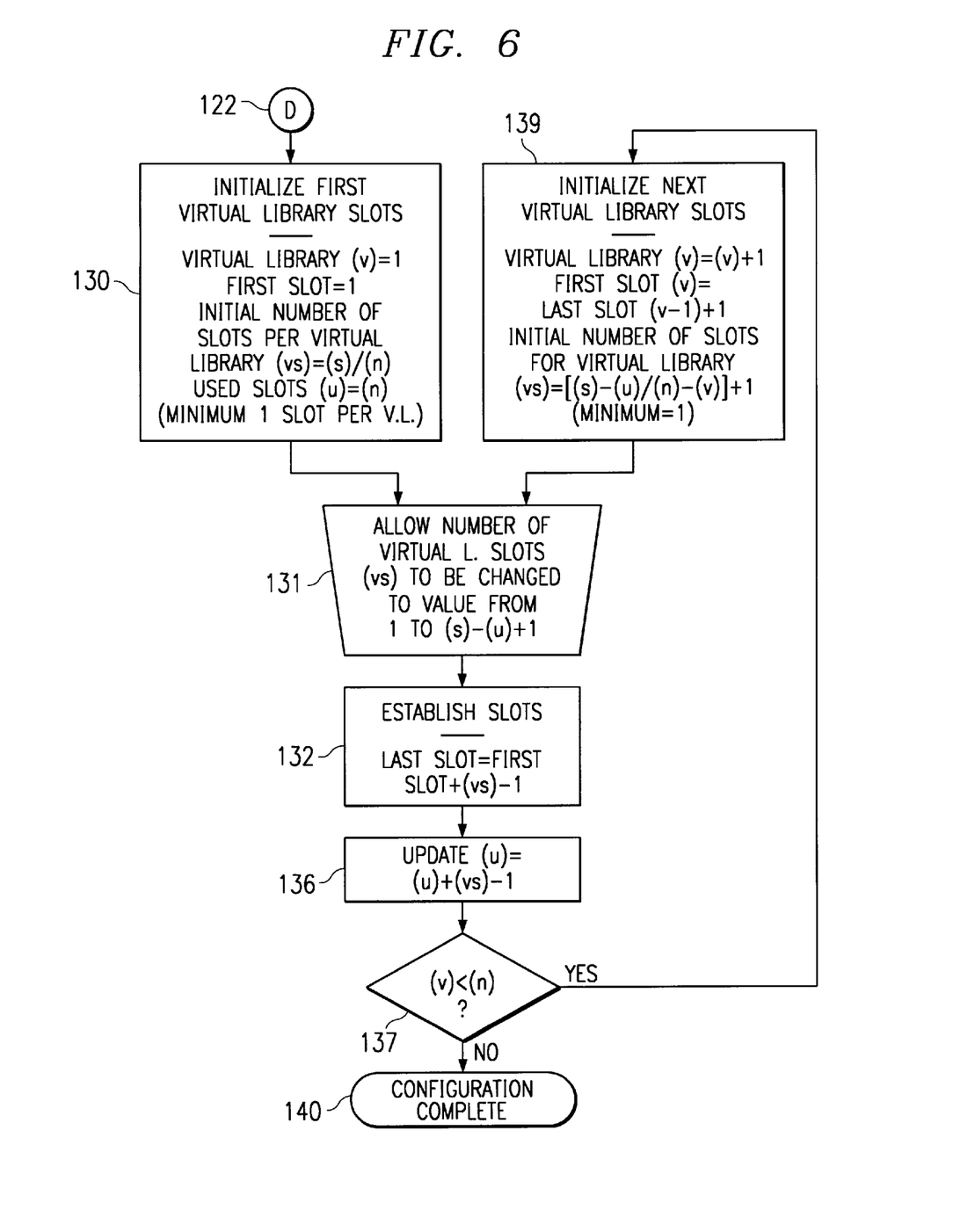

Referring to FIGS. 1 and 6, the process for assigning storage slots 30 to the virtual libraries is illustrated, wherein the user is allowed to select a number of the storage slots to be assigned to the virtual libraries, with the default that the virtual libraries having no selected number of storage slots are assigned the remaining number of storage slots equally. Other defaults may also be implemented.

The assignment of storage slots to virtual libraries is the same as an assignment of the storage slots to all hosts and host ports sharing the same virtual library.

Connector 122 leads to step 130. Because the number of storage slots 30 that the user intends to select for the first virtual library is unknown at this stage of the process, step 130 is provided to initialize the first virtual library at the default level of an equal share of the storage slots. Thus, the initial definition of the first virtual library may take the following form, wherein [v] represents the index of all defined virtual libraries from 1 to (n):

v=1 first_slot[v]=1 last_slot[v]=s/h virtual_library_slots[v]=s/h u (used slots)=n.

The number of "used" slots is set to the number (n) of virtual libraries to insure that each virtual library has at least one storage slot. Any other minimum value may be established in alternative embodiments. The division quotient must be rounded up (or down) to an integer. Such rounding is also assumed hereinafter for any quotient.

Step 131 allows the user to assign a different number of storage slots 30 to the virtual library. The user is allowed to set the number of virtual library storage slots (vs) to any value from 1 to (s)–(u)+1. In other words, with the maximum number of slots in the library (s), the user may assign up to the number of storage slots available after taking into account the number of storage slots designated as "used" and either already assigned or reserved for the remaining virtual libraries, plus the 1 slot reserved for use by the current virtual library.

Step 132 establishes the number of storage slots for the virtual library by designating the new last slot as the first slot value plus the number of virtual library storage slots (vs), from step 131, less 1. The calculation takes the form of last_slot=first_slot+(vs)−1.

In step 136, the number of "used" storage slots is updated. The update resets the value from the previous "used" value to add in the number of storage slots that were allocated in step 131, less the slot reserved for the virtual library in the "used" term. The update may take the form (u)=u+(vs)−1.

The function of step 137 is to determine whether the number of storage slots 30 has been set for all the virtual libraries. Thus, the decision is whether the current virtual library (v) is less than the selected number of virtual libraries (n). If "YES", the last virtual library has not been reached, and the process moves to define the next virtual library in step 139.

Step 139 is provided to initialize the next virtual library. The next virtual library (v) value is incremented, v=v+1, in step 139 and is defined as taking the next sequence of storage slots, which are initialized as being equally divided amongst the remaining virtual libraries, as the default. The definition of the next virtual library may take the following form, wherein [v] represents the index of all defined virtual libraries from 1 to (n):

v=v+1 first_slot[v]=last_slot[v−1]+1

(vs) virtual_library_slots[v]={(s−u)/(n−v+1)}+1.

The equally divided number of storage slots for the virtual library is calculated as the number of originally available slots (s) less those indicated as used (u), divided by the total number of virtual libraries (n) less the number of the virtual libraries previously initialized, which is one less than the number of the current virtual library (−(v−1)), or (−v+1), plus the one slot reserved for the current library in the "used" term. Again, alternative defaults may be provided, such as the simplified, original (s)/(n) calculation.

Steps 131–136 are repeated, this time for the next virtual library, again allowing the user to select a different number of storage slots 30 (vs) for the virtual library, establishing the last slot, and updating the number of used slots (u).

Step 137 then determines whether the number of storage slots 30 has been set for all the virtual libraries. The current virtual library (v) is compared to the selected number of virtual libraries (n) to determine if the current number is less than the total. If the numbers are equal, "NO", the last virtual library has been reached, and the optional configuration is complete 140.

Many alternative process steps can be envisioned for similarly accomplishing the configuration of the virtual libraries allowing user selections, and are considered within the scope of the present invention.

Figure 7:
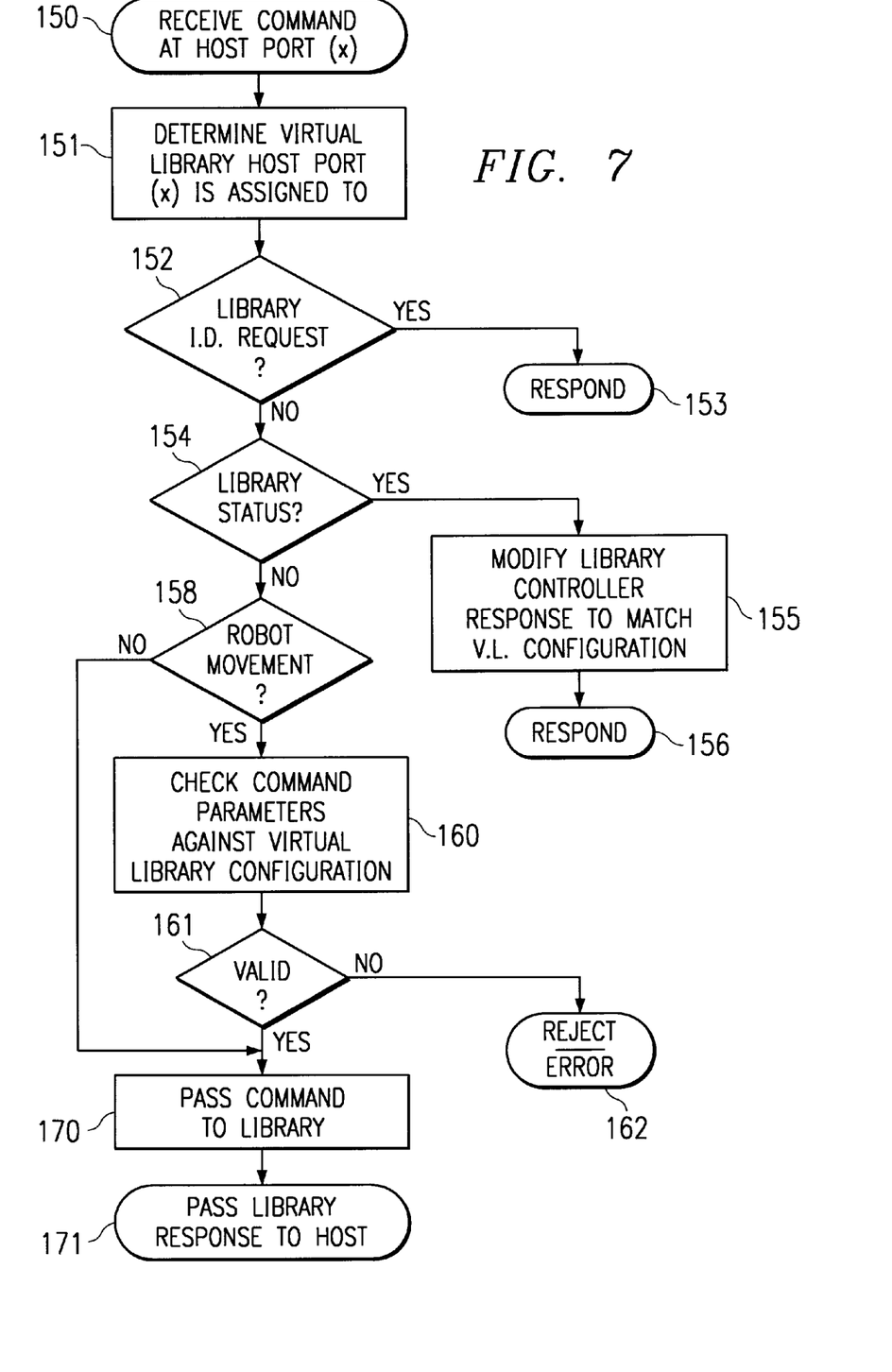
FIG. 7 is a flow chart depicting the method of the present invention for operating the shared automated data storage library of FIG. 1.

When the configuration is complete, whether by autoconfiguring or by user selection, the virtual libraries are ready to use. Another aspect of the present invention is to allow the connected hosts to operate the respective virtual libraries. Referring to FIGS. 1 and 7, the method of the present invention passes all commands to the library 10 with a few exceptions.

A command is received in step 150 at one of the host ports 51–53. In step 151, the virtual library that the host port is assigned to is determined. The assignment was established in step 76 of FIG. 2 or in step 112 of FIG. 4. Step 152 determines whether the received command is a library identification request, which is a request to identify the parameters of the virtual library. If "YES", the response is made directly by the library sharing system in step 153.

Step 154 determines whether the command is a request for library status, such as the mode sense or read element status (e.g., is the data storage drive loaded). If "YES", the library data is modified to reflect the assigned virtual library configuration in step 155 and the response is made in step 156.

Step 158 determines whether the command is for operation of the accessing robot 32. Examples of robot movement are to move a data storage medium, for example between storage slots 30, or between a storage slot and a data storage drive 21–26, or between a media I/O slot 35 and either a storage slot or a data storage drive, or an exchange of media between any of the above locations. If "YES", steps 160 and 161 determine whether the command source and destination element addresses are valid for the assigned virtual library. For example, the host may attempt to move a media cartridge to or from the wrong virtual library drive or slot. If any of the addresses are not valid for the assigned virtual library, step 162 rejects the command and notifies the host that the command was in error. If the command is valid, step 170 passes the command to the library controller 31, which causes the commanded robot operation to be conducted, and step 171 passes the library response to the host.

If step 158 does not identify the input command as relating to robot movement, the command is not one of the exceptions and is passed to the library 10 in step 170, and step 171 passes the library response to the host.

The commands or requests from the hosts are provided to the library 10 on a "first-come", "first-served" basis.

If the library 10 is occupied with another virtual library, all commands received from other hosts while waiting may be queued until completion of the command in progress, and then sent to the library 10.

Many alternative process steps can be envisioned for similarly operating the configured virtual libraries, and are considered within the scope of the present invention.

The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method for externally partitioning a data storage library into multiple virtual libraries for access by a plurality of hosts, each host having a host port, said data storage library having a plurality of data storage drives, a plurality of storage slots, a library controller, said library controller identifying an identifier of each of said data storage drives and identifying said storage slots, a library port coupled to said library controller, and at least one accessing robot controlled by said library controller, comprising the steps of:

at a node intermediate to said library port and to said host ports, inquiring of said host ports to identify the number of host ports (h);

inquiring, at said node, via said library port, of said library controller to determine said data storage drive identifiers and the total number of said storage slots (s);

identifying, at said node, by employing said data storage drive identifiers, each said data storage drive associated with each said host port; and sequentially creating virtual libraries, assigning to each virtual library at least one of said host ports (h), said data storage drives identified as associated with said assigned host port, and a portion of said storage slots (s).

2. The method for externally partitioning a data storage library of claim 1, wherein said storage slots are arranged in a sequence, and wherein said assignment to each of said virtual libraries of said storage slots (s) comprises assigning said storage slots identified by said library controller to each of said hosts as a sequence of said storage slots (s).

3. The method for externally partitioning a data storage library of claim 1, wherein each of said virtual libraries is assigned one of said host ports (h), and wherein said assignment to each of said virtual libraries of said storage slots (s) comprises assigning to each of said virtual libraries an equal number of said storage slots identified by said library controller, employing the formula (s)/(h).

4. The method for externally partitioning a data storage library of claim 1, wherein an operator interface is provided at which an operator may select a number of said hosts to share a single one of said virtual libraries by identifying extra host ports for a single virtual library, the total number of virtual libraries (n) therefore being reduced to the effective number of host ports (h) remaining after combining the hosts sharing virtual libraries, and wherein said step of assigning to each of said virtual libraries said portion of said storage slots (s) comprises assigning the same storage slots to said host ports sharing said one of said virtual libraries.

5. The method for externally partitioning a data storage library of claim 4, wherein some of said host ports share the same virtual library, and wherein said assignment to each of said virtual libraries of said storage slots (s) comprises assigning to each of said virtual libraries (n) an equal number of said storage slots identified by said library controller, employing the formula (s)/(n).

6. The method for externally partitioning a data storage library of claim 1, wherein an operator interface is provided at which an operator may select a number of said storage slots to be assigned to a selected one of said virtual libraries, and said step of assigning said storage slots to said virtual libraries additionally comprises designating said operator selected number of said storage slots to be assigned to said selected virtual library, and assigning said remaining storage slots to said remaining virtual libraries equally.

7. The method for externally partitioning a data storage library of claim 1, wherein at least one of said data storage drives are initially unassigned, and wherein an operator interface is provided at which an operator may assign said unassigned data storage drive to a virtual library, and wherein said step of assigning said drives to said virtual libraries additionally comprises recognizing said operator assignment of said data storage drives.

8. A method for externally partitioning and operating a data storage library, partitioning said data storage library into multiple virtual libraries for access by a plurality of hosts, each host having a host port, said data storage library having a plurality of data storage drives, a plurality of storage slots, a library controller, said library controller identifying an identifier of each of said data storage drives and identifying said storage slots, a library port coupled to said library controller, and at least one accessing robot controlled by said library controller, and operating said partitioned library, comprising the steps of:

at a node intermediate to said library port and to said host ports, inquiring of said host ports to identify the number of host ports (h);

inquiring, at said node, via said library port, of said library controller to determine said data storage drive identifiers and the total number of said storage slots (s);

identifying, at said node, by employing said data storage drive identifiers, each said data storage drive associated with each said host port;

sequentially creating virtual libraries, assigning to each virtual library at least one of said host ports (h), said data storage drives identified as associated with said assigned host port, and a portion of said storage slots (s); and responding to a command received at one of said host ports by determining the virtual library that said host port is assigned to, and, if said received command is a request for operating said virtual library, by determining whether said received command parameters are valid for said virtual library, and, if valid, by supplying said request to said library controller.

9. The method for externally partitioning and operating a data storage library of claim 8, wherein said step of responding to a command received at one of said host ports, additionally comprises rejecting any said received command having parameters that are not valid for said virtual library, and providing an error sense signal to said one host port.

10. The method for externally partitioning and operating a data storage library of claim 8, wherein said step of responding to a command received at one of said host ports, additionally comprises supplying said valid request to said library controller on a first-come, first-served basis.

11. A system for externally partitioning a data storage library into multiple virtual libraries for access by a plurality of hosts, said data storage library having a plurality of data storage drives, a plurality of storage slots, a library controller, said library controller identifying an identifier of each of said data storage drives and identifying said storage slots, said library port coupled to said library controller, and at least one accessing robot controlled by said library controller, said system comprising:

a library port coupled to said library;

a plurality of host ports, each coupled to one of said plurality of hosts;

a processor coupled to said library port and inquiring, via said library port, of said library controller to determine said data storage drive identifiers and the total number of said storage slots (s);

said processor coupled to said host ports and inquiring of said host ports to identify the number of host ports (h) coupled to said hosts, and, by employing said data storage drive identifiers, identifying each said data storage drive associated with each said host port; and said processor sequentially creating virtual libraries, assigning to each virtual library at least one of said host ports (h), said data storage drives identified as associated with said assigned host port, and a portion of said storage slots (s).

12. The system for externally partitioning a data storage library of claim 11, wherein at least one of said data storage drives are initially unassigned, and wherein said system additionally comprises an operator interface at which an operator may assign said unassigned data storage drive a virtual library, and wherein said processor additionally recognizing said operator assignment of said data storage drives.

13. The system for externally partitioning a data storage library of claim 11, wherein each of said coupled ports comprises a SCSI port.

14. The system for externally partitioning a data storage library of claim 11, additionally comprising an operator interface coupled to said processor at which an operator may select a number of said hosts to share a single one of said virtual libraries by identifying extra host ports for a single virtual library, the total number of virtual libraries (n) therefore being reduced to the effective number of host ports (h) remaining after combining the hosts sharing virtual libraries, and wherein said processor responds to said selection by assigning the same storage slots to said host ports sharing said one of said virtual libraries.

15. The system for externally partitioning a data storage library of claim 11, additionally comprising an operator interface coupled to said processor at which an operator may select a number of said storage slots to be assigned to a selected one of said virtual libraries, and wherein said processor responds to said selection by designating said operator selected number of said storage slots to be assigned to said selected virtual library, and assigning said remaining storage slots to said remaining virtual libraries equally.

16. A system for externally partitioning and operating a data storage library, partitioning said data storage library into multiple virtual libraries for access by a plurality of hosts, and operating said partitioned library, said data storage library having a plurality of data storage drives, a plurality of storage slots, a library controller, said library controller identifying an identifier of each of said data storage drives and identifying said storage slots, said library port coupled to said library controller, and at least one accessing robot controlled by said library controller, said system comprising:

a library port coupled to said library;

a plurality of host ports, each coupled to one of said plurality of hosts;

a processor coupled to said library port and inquiring, via said library port, of said library controller to determine said data storage drive identifiers and the total number of said storage slots (s);

said processor coupled to said host ports and inquiring of said host ports to identify the number of host ports (h) coupled to said hosts, and, by employing said data storage drive identifiers, identifying each said data storage drive associated with each said host port;

said processor sequentially creating virtual libraries, assigning to each virtual library at least one of said host ports (h), said data storage drives identified as associated with said assigned host port, and a portion of said storage slots (s); and said processor responding to a command received at one of said host ports by determining the virtual library that said host port is assigned to, and, if said received command is a request for operating said virtual library, by determining whether said received command parameters are valid for said virtual library, and, if valid, by supplying said request to said library controller.

17. The system for externally partitioning and operating a data storage library of claim 16, wherein, upon said processor responding to any said command received at one of said host ports having parameters that are not valid for said virtual library, said processor additionally rejects said received command having parameters that are not valid for said virtual library, and provides an error sense signal to said one host port.

18. The system for externally partitioning and operating a data storage library of claim 16, wherein said processor supplies said request to said library controller on a first-come, first-served basis.

19. An article of manufacture comprising a computer readable medium having computer readable program code embodied therein for externally partitioning a data storage library into multiple virtual libraries for access by a plurality of hosts, each host having a host port, said data storage library having a plurality of data storage drives, a plurality of storage slots, a library controller, said library controller identifying an identifier of said data storage drives and identifying said storage slots, a library port coupled to said library controller, and at least one accessing robot controlled by said library controller, comprising:

computer readable program code which causes a programmable computer processor at a node intermediate said library port and said host ports to inquire of said host ports to identify the number of host ports (h);

computer readable program code which causes said programmable computer processor to inquire, via said library port, of said library controller to determine said data storage drive identifiers and the total number of said storage slots (s);

computer readable program code which causes said programmable computer processor to identify, by employing said data storage drive identifiers, each said data storage drive associated with each said host port; and computer readable program code which causes said programmable computer processor to sequentially create virtual libraries, assigning to each virtual library at least one of said host ports (h), said data storage drives identified as associated with said assigned host port, and a portion of said storage slots (s).

20. The article of manufacture of claim 19, wherein said storage slots are arranged in a sequence, and wherein said computer readable program code which causes said programmable computer processor to assign said storage slots (s) to each of said virtual libraries additionally causes said programmable computer processor to assign said storage slots identified by said library controller to each of said hosts as a sequence of said storage slots (s).

21. The article of manufacture of claim 19, wherein each of said virtual libraries is assigned one of said host ports (h), and wherein said computer readable program code which causes said programmable computer processor to assign said storage slots (s) to each of said virtual libraries, additionally causes said programmable computer processor to assign to each of said virtual libraries an equal number of said storage slots identified by said library controller, employing the formula (s)/(h).

22. The article of manufacture of claim 19, wherein said programmable computer processor additionally comprises an operator interface at which an operator may select a number of said hosts to share a single one of said virtual libraries by identifying extra host ports for a single virtual library, the total number of virtual libraries (n) therefore being reduced to the effective number of host ports (h) remaining after combining the hosts sharing virtual libraries, and wherein said computer readable program code which causes said programmable computer processor to assign said storage slots (s) to each of said virtual libraries causes said programmable computer processor to assign the same storage slots to said host ports sharing said one of said virtual libraries.

23. The article of manufacture of claim 22, wherein some of said host ports share the same virtual library, and wherein said computer readable program code which causes said programmable computer processor to assign said storage slots (s) to each of said virtual libraries, additionally causes said programmable computer processor to assign to each of said virtual libraries (n) an equal number of said storage slots identified by said library controller, employing the formula (s)/(n).

24. The article of manufacture of claim 19, wherein said programmable computer processor additionally comprises an operator interface at which an operator may select a number of said storage slots to be assigned to a selected one of said virtual libraries, and wherein said computer readable program code which causes said programmable computer processor to assign said storage slots (s) to each of said virtual libraries, additionally causes said programmable computer processor to designate said operator selected number of said storage slots to be assigned to said selected virtual library, and to assign said remaining storage slots to said remaining virtual libraries equally.

25. The article of manufacture of claim 19, wherein at least one of said data storage drives are initially unassigned, and wherein said programmable computer processor additionally comprises an operator interface at which an operator may assign said unassigned data storage drive to a virtual library, and wherein said computer readable program code which causes said programmable computer processor to assign said data storage drives to said virtual libraries additionally causes said programmable computer processor to recognize said operator assignment of said data storage drives.

26. An article of manufacture comprising a computer readable medium having computer readable program code embodied therein for externally partitioning and operating a data storage library, partitioning said data storage library into multiple virtual libraries for access by a plurality of hosts, each host having a host port, said data storage library having a plurality of data storage drives, a plurality of storage slots, a library controller, said library controller identifying an identifier of each of said data storage drives and identifying said storage slots, a library port coupled to said library controller, and at least one accessing robot controlled by said library controller, comprising:

computer readable program code which causes a programmable computer processor at a node intermediate said library port and said host ports to inquire of said host ports to identify the number of host ports (h);

computer readable program code which causes said programmable computer processor to inquire, via said library port, of said library controller to determine said data storage drive identifiers and the total number of said storage slots (s);

computer readable program code which causes said programmable computer processor to identify, by employing said data storage drive identifiers, each data storage drive associated with each said host port;

computer readable program code which causes said programmable computer processor to sequentially create virtual libraries, assigning to each virtual library at least one of said host ports (h), said data storage drives identified as associated with said assigned host port, and a portion of said storage slots (s); and computer readable program code which causes said programmable computer processor to respond to a command received at one of said host ports by determining the virtual library that said host port is assigned to, and, if said received command is a request for operating said virtual library, to determine whether said received command parameters are valid for said virtual library, and, if valid, to supply said request to said library controller.

27. The article of manufacture of claim 26, wherein said computer readable program code which causes said programmable computer processor to respond to a command received at one of said host ports, additionally causes said programmable computer processor to reject any said received command having parameters that are not valid for said virtual library, and provide an error sense signal to said one host port.

28. The article of manufacture of claim 26, wherein said computer readable program code which causes said programmable computer processor to respond to a command received at one of said host ports, additionally causes said programmable computer processor to supply said valid request to said library controller on a first-come, first-served basis.

29. A computer program product usable with a programmable computer processor having computer readable program code embodied therein for externally partitioning a data storage library into multiple virtual libraries for access by a plurality of hosts, each host having a host port, said data storage library having a plurality of data storage drives, a plurality of storage slots, a library controller, said library controller identifying an identifier of each of said data storage drives and identifying said storage slots, a library port coupled to said library controller, and at least one accessing robot controlled by said library controller, said programmable computer processor intermediate said library port and said host ports, comprising:

computer readable program code which causes said programmable computer processor to inquire of said host ports to identify the number of host ports (h);

computer readable program code which causes said programmable computer processor to inquire, via said library port, of said library controller to determine said data storage drive identifiers and the total number of said storage slots (s);

computer readable program code which causes said programmable computer processor to identify, by employing said data storage drive identifiers, each data storage drive associated with each said host port; and computer readable program code which causes said programmable computer processor to sequentially create virtual libraries, assigning to each virtual library at least one of said host ports (h), said data storage drives identified as associated with said assigned host port, and a portion of said storage slots (s).

30. The computer program product of claim 29, wherein said storage slots are arranged in a sequence, and wherein said computer readable program code which causes said programmable computer processor to assign said storage slots (s) to each of said virtual libraries additionally causes said programmable computer processor to assign said storage slots identified by said library controller to each of said hosts as a sequence of said storage slots (s).

31. The computer program product of claim 29, wherein each of said virtual libraries is assigned one of said host ports (h), and wherein said computer readable program code which causes said programmable computer processor to assign said storage slots (s) to each of said virtual libraries, additionally causes said programmable computer processor to assign to each of said virtual libraries an equal number of said storage slots identified by said library controller, employing the formula (s)/(h).

32. The computer program product of claim 29, wherein said programmable computer processor additionally comprises an operator interface at which an operator may select a number of said hosts to share a single one of said virtual libraries by identifying extra host ports for a single virtual library, the total number of virtual libraries (n) therefore being reduced to the effective number of host ports (h) remaining after combining the hosts sharing virtual libraries, and wherein said computer readable program code which causes said programmable computer processor to assign said storage slots (s) to each of said virtual libraries causes said programmable computer processor to assign the same storage slots to said host ports sharing said one of said virtual libraries.

33. The computer program product of claim 32, wherein some of said host ports share the same virtual library, and wherein said computer readable program code which causes said programmable computer processor to assign said storage slots (s) to each of said virtual libraries, additionally causes said programmable computer processor to assign to each of said virtual libraries (n) an equal number of said storage slots identified by said library controller, employing the formula (s)/(n).

34. The computer program product of claim 29, wherein said programmable computer processor additionally comprises an operator interface at which an operator may select a number of said storage slots to be assigned to a selected one of said virtual libraries, and wherein said computer readable program code which causes said programmable computer processor to assign said storage slots (s) to each of said virtual libraries, additionally causes said programmable computer processor to designate said operator selected number of said storage slots to be assigned to said selected virtual library, and to assign said remaining storage slots to said remaining virtual libraries equally.

35. The computer program product of claim 29, wherein at least one of said data storage drives are initially unassigned, and wherein said programmable computer processor additionally comprises an operator interface at which an operator may assign said unassigned data storage drive to a virtual library, and wherein said computer readable program code which causes said programmable computer processor to assign said data storage drives to said virtual libraries additionally comprises causing said programmable computer processor to recognize said operator assignment of said data storage drives.

36. A computer program product usable with a programmable computer processor having computer readable program code embodied therein for externally partitioning and operating a data storage library, partitioning said data storage library into multiple virtual libraries for access by a plurality of hosts, each host having a host port, said data storage library having a plurality of data storage drives, a plurality of storage slots, a library controller, said library controller identifying an identifier of each of said data storage drives and identifying said storage slots, a library port coupled to said library controller, and at least one accessing robot controlled by said library controller, said programmable computer processor intermediate said library port and said host ports, comprising:

computer readable program code which causes said programmable computer processor to inquire of said host ports to identify the number of host ports (h);

computer readable program code which causes said programmable computer processor to inquire, via said library port, of said library controller to determine said data storage drive identifiers and the total number of said storage slots (s);

computer readable program code which causes said programmable computer processor to identify, by employing said data storage drive identifiers, each data storage drive associated with each said host port;

computer readable program code which causes said programmable computer processor to sequentially create virtual libraries, assigning to each virtual library at least one of said host ports (h), said data storage drives identified as associated with said assigned host port, and a portion of said storage slots (s); and computer readable program code which causes said programmable computer processor to respond to a command received at one of said host ports by determining the virtual library that said host port is assigned to, and, if said received command is a request for operating said virtual library, to determine whether said received command parameters are valid for said virtual library, and, if valid, to supply said request to said library controller.

37. The computer program product of claim 36, wherein said computer readable program code which causes said programmable computer processor to respond to a command received at one of said host ports, additionally causes said programmable computer processor to reject any said received command having parameters that are not valid for said virtual library, and provide an error sense signal to said one host port.

38. The computer program product of claim 36, wherein said computer readable program code which causes said programmable computer processor to respond to a command received at one of said host ports, additionally causes said programmable computer processor to supply said valid request to said library controller on a first-come, first-served basis.

* * * * *